(12) United States Patent
Karunen et al.

(10) Patent No.: US 7,068,313 B2
(45) Date of Patent: Jun. 27, 2006

(54) METHOD AND ARRANGEMENT FOR PROCESSING MEASUREMENT DATA

(75) Inventors: Juha Karunen, Littoinen (FI); Janne Salonen, Mynämäki (FI)

(73) Assignee: Wallac Oy, Turku (FI)

( * ) Notice: Subject to any disclaimer, the term of this patent is extended or adjusted under 35 U.S.C. 154(b) by 636 days.

(21) Appl. No.: 10/067,826

(22) Filed: Feb. 8, 2002

(65) Prior Publication Data

US 2003/0151683 A1  Aug. 14, 2003

(51) Int. Cl.
*H04N 9/64* (2006.01)

(52) U.S. Cl. ...................... 348/246; 348/250

(58) Field of Classification Search ........... 348/209.99, 348/208.99, 208.14, 125, 302, 311, 246, 247, 348/250, 241, 243, 244, 245, 248, 249, 257, 348/207.1, 294, 297, 98.2, 98.8, 98.11, 98.12, 348/251, 298, 299, 303
See application file for complete search history.

(56) References Cited

U.S. PATENT DOCUMENTS

| | | | | |
|---|---|---|---|---|
| 5,848,123 | A * | 12/1998 | Strommer | 378/98.8 |
| 5,973,310 | A * | 10/1999 | Lunscher | 250/203.1 |
| 6,307,915 | B1 * | 10/2001 | Frojdh | 378/98.8 |
| 6,340,989 | B1 * | 1/2002 | Oda | 348/246 |
| 6,424,750 | B1 * | 7/2002 | Colbeth et al. | 382/260 |
| 6,593,961 | B1 * | 7/2003 | Perino | 348/187 |
| 6,784,926 | B1 * | 8/2004 | Korpi et al. | 348/207.99 |
| 6,800,452 | B1 * | 10/2004 | McNeil et al. | 435/29 |
| 6,947,084 | B1 * | 9/2005 | Kaifu et al. | 348/247 |
| 2002/0003860 | A1 * | 1/2002 | Francke et al. | 378/98.8 |
| 2002/0080917 | A1 * | 6/2002 | Granfors et al. | 378/98.8 |
| 2002/0176535 | A1 * | 11/2002 | Dixon et al. | 378/62 |
| 2002/0181654 | A1 * | 12/2002 | Baertsch et al. | 378/98.8 |
| 2003/0058998 | A1 * | 3/2003 | Aufrichtig et al. | 378/207 |
| 2003/0095631 | A1 * | 5/2003 | Rosner | 378/98.12 |
| 2003/0226984 | A1 * | 12/2003 | Iwakiri | 250/580 |

FOREIGN PATENT DOCUMENTS

| | | |
|---|---|---|
| EP | 0 776 124 A2 | 5/1997 |
| EP | 1037010 A2 * | 9/2000 |
| EP | 1063844 A1 * | 12/2000 |
| JP | 2000136984 A * | 5/2000 |
| JP | 2001 177756 | 6/2001 |
| JP | 2002-185724 | 6/2002 |

OTHER PUBLICATIONS

Zhimin Zhou, "Frame Transfer CMOS Active Pixel Sensor With Pixel Binning" IEEE Transactions on Electron Devices, vol. 44, No. 10, Oct. 1997.*

* cited by examiner

*Primary Examiner*—Ngoc Yen Vu
*Assistant Examiner*—Nelson D. Hernandez
(74) *Attorney, Agent, or Firm*—Young & Thompson

(57) ABSTRACT

The invention applies to the binning procedure of data, which is measured with a CCD (Charge-Coupled Device) sensor unit. There is created a solution for measurement of radiation, in which a good signal-to-noise value is achieved, and still it is possible to exploit standard CCD units. This is achieved by selecting the binning areas on the basis of position of defected pixels (461, 462) in a CCD unit (411). One idea is to determine the locations of the defected pixels and to use this information for determining pixel groups that form the super pixels. In a preferable embodiment super pixels (A1–A5, B1–B5, C1–C5, D1–D5, E1–E5) are first determined using a selected binning factor, and those super pixels that would be affected by defected pixels are then reduced into one or more smaller super pixels (B2$i$–E2$i$, B2$k$–E2$k$, C4$i$–E4$i$), which are not affected by the defects.

17 Claims, 5 Drawing Sheets

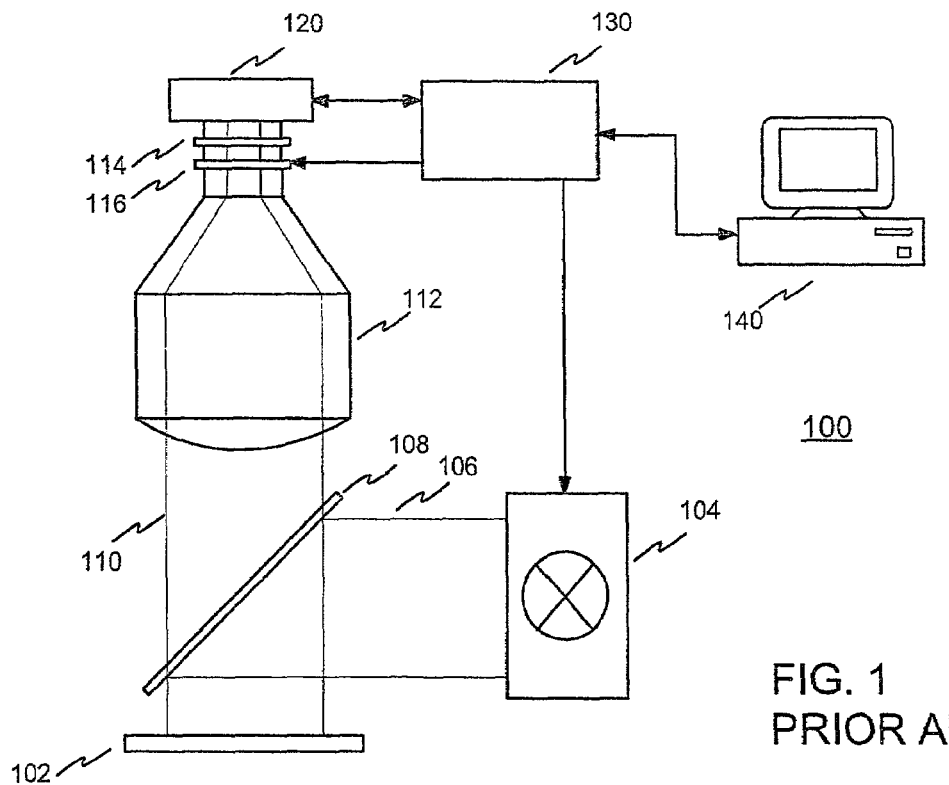
FIG. 1
PRIOR ART
FIG. 2
PRIOR ART
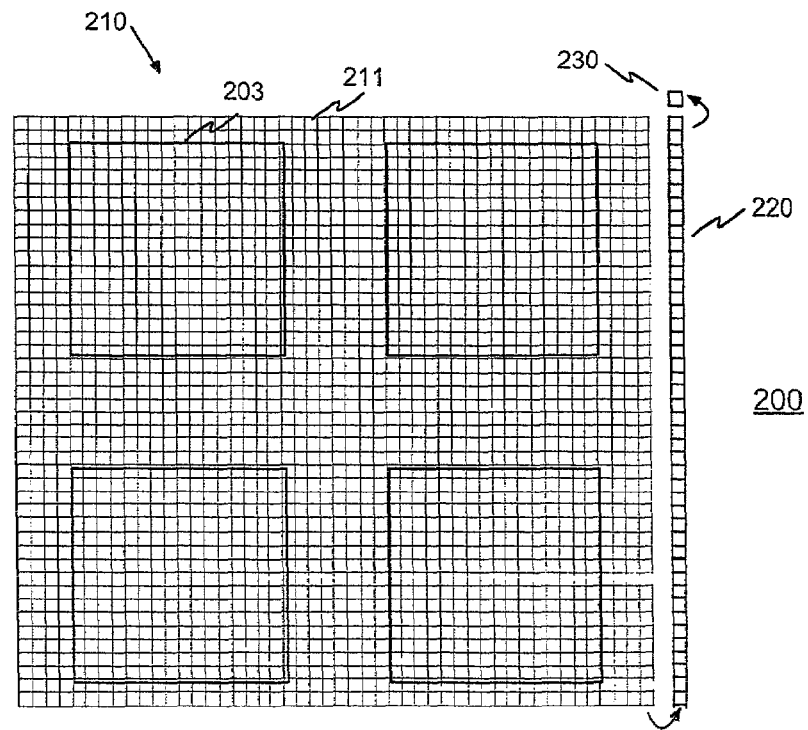

METHOD AND ARRANGEMENT FOR PROCESSING MEASUREMENT DATA

BACKGROUND ART OF THE INVENTION

This invention relates generally to the processing of measured data. Especially the invention applies to the binning procedure of data, which is measured with a CCD (Charge-Coupled Device) sensor unit. The invention is preferably used in photo-metrics for measuring radiation from samples on a well plate. One purpose of the invention is to achieve improvement in signal-to-noise values of the measurements.

CCD sensors are generally used in photometrics for measuring radiation, such as light, from samples. The samples are usually inserted into wells on a well plate in photometries equipment. Next one implementation of such a measurement is explained as an example. However, this implementation is not meant in any way to restrict the field of use of the present invention.

FIG. 1 shows a prior art arrangement of a photometrics device 100. The samples to be measured are inserted onto a well plate 102. The samples may be excited with radiation from a lamp unit 104. The excitation radiation 106 is reflected by a beam-slitter mirror 108 onto the well plate. The lamp unit 104 is controlled to give radiation with a determined intensity. After a possible excitation, the radiation 110 from the samples is led to a CCD unit 120. A lens system 112 creates an image of the samples onto a CCD screen. The exposure period is controlled with a shutter 116. The radiation is further filtered with an emission filter 114 in order to select the determined wavelength of radiation for the measurement. The lamp unit 104, the shutter 116 and the CCD unit 120 are controlled with a control unit 130. The measurement process is further controlled by a computer unit 140. The computer unit also processes the output data of the measurements to achieve radiation intensity results.

FIG. 2 illustrates registers of a CCD unit 200. The CCD unit comprises a parallel register 210 that consists of a matrix of charge wells 211. As the surface is exposed to radiation, charges are formed into the charge wells according to the intensity of the radiation exposure. A charge pattern thus accumulates in the parallel register. After the exposure the charge wells or "pixels" of the matrix are read by shifting the charges at each row of the parallel register towards a shift register or "serial register" 220. After shifting the charges by one step, the charge wells of the shift register comprise charges of one column of the parallel register. The shift register is then read by shifting the charges at the shift register towards an output charge well or "output node" 230. After each step of shifting the output node is read. After all the charge wells of the shift register are read, the charges at the parallel register are further shifted by one step. The readout procedure is further repeated until the whole parallel register is read. The measurement data is thus converted into serial set of pixel charge values that present radiation intensities at the pixels. FIG. 2 also shows images of four samples 203 of a well plate. After processing the ouput data, an image can be formed where pixels within the sample image area present the radiation intensity of the corresponding positions within the sample image.

One problem in photometrics is related to the fact that the intensity of the radiation is low and therefore the signal-to-noise ratio of the measurement data is often low. In order to increase the signal-to-noise ratio, binning method is often used. Binning is a technique of combining charge from adjacent pixels during the readout process. The charge is collected as described above, but the readout is programmed differently. With parallel binning, when charge is shifted from the parallel register into the shift register, charge is accumulated from two or more columns before the serial shifting begins. With serial binning, two or more charge packets are similarly accumulated in the output node before the charge is digitalized and read out.

FIG. 3 illustrates how groups of pixels in a CCD unit are combined into larger "super pixels". Binning is specified by a binning factor, which is the number of pixels to be combined on the CCD. For example, "8×8 binning" is used in FIG. 3, which means that each group of 8×8 is accumulated in the binning. Thus the CCD of 40×40 pixels is grouped into 5×5 super pixels in the readout (A1–A5, B1–B5, C1–C5, D1–D5 and E1–E5). If binning is used, the capacity of the shift register and the output charge well must be designed according to the total charge of the pixels that are accumulated in binning.

Binning improves the signal-to-noise ratio and extends the dynamic range of the CCD imager, but at the expense of spatial resolution. Binning is thus useful in applications where resolution is not of primary concern. Because binning reduces the number of pixels to be processed and digitized, the readout speed is also increased. If, for example, 2×2 binning is used, the resolution (number of pixels in the corresponding direction of the image) becomes half of the corresponding resolution without binning, and the signal-to-noise value becomes almost twice as good as the corresponding value without binning. This improvement of signal-to-noise value is related to averaging the noise from the parallel register of the CCD unit. Therefore, the signal-to-noise value related to the readout noise improves even by the binning factor. Binning is advantageous in photometrics, because there has been no need for obtaining high resolution.

One problem relating to CCD units is the fact that there are often defects in the charge wells, which serve as pixels. In general, it is very difficult to produce a CCD unit with no such defects. In economical mass production of CCD units it is usual that there is, just for example, one defected pixel in 1000 pixels in average. In most applications of CCD units it does not have a significant effect if a few pixels of a CCD unit are defected. However, if CCD unit is used in accurate measurements, and especially, if binning is used, then a few defected pixels may decrease the quality of the measurements significantly. In this patent application the denomination "defected" means that the charge well does not function according to a determined specification, which causes that its ability to convert radiation into charges or its ability to maintain the accumulated charge or its ability to transfer a charge from/to its neighbouring charge well is worse than what is required. "Defected" may also mean that additional charges are formed into the charge well thus causing a "white defect".

In FIG. 3 there are shown two defected pixels 361 and 362. When binning is used in the readout the two defected pixels cause an error in measured value of the whole super pixels B2 and C4. And additionally, in the readout process there are also other pixels whose charges are shifted to the serial register through the defected pixels. These pixels 371 and 372 are marked with diagonal lines in FIG. 3. When the charge wells of the pixels 361 and 362 are defected, they may not retain the charges shifted through the defected charge wells in the correct value. Therefore the value of the charges from all the pixels 371 and 372 may be distorted when the charges are accumulated into the serial register. This causes an error in the measured value of the super pixels C2, D2, E2, D4, and E4 as well. As a result the measured values of 7 super pixels out of 25 are incorrect because of defects only in two pixels out of 1600. It is clear that the capacity of the measurement equipment is thus significantly degraded. On the other hand, if special CCD units with no defects would be manufactured, this would make the measurement equipment too expensive for many measurement applications.

SUMMARY OF THE INVENTION

It is the objective of the present invention to create a solution for measurement of radiation, in which a good signal-to-noise value is achieved, and still it is possible to exploit standard CCD units. This objective is achieved by selecting the binning areas on the basis of position(s) of defected pixels in a CCD unit.

One idea of the invention is to determine the locations of the defected pixels and to use this information for determining pixel groups that form the super pixels. In a preferable embodiment of the invention super pixels are first determined using a selected binning factor, and those super pixels that would be affected by defected pixels are then reduced into one or more smaller super pixels, which are not affected by the defects.

One straightforward way to implement the invention is to initiate reading charge value of the output node when charges of distorted value enter the charge well of the serial register, which is closest to the output node. This way it is possible to accumulate in the output node charges of super pixels with smaller size, which super pixels do not include distorted charges.

With the present invention it is possible to achieve a maximal signal-to-noise ratio because on one hand an optimal binning ratio can be used, and on the other hand the readout process can use charges from all pixels that are not distorted due to the defects in the CCD unit.

The invention applies to a method for measuring radiation from an object with a charge coupled device comprising a matrix of pixels arranged in rows and columns, wherein at least one pixel is defected, in which method radiation creates charges to the charge wells of the pixels,
charges from a column of the pixels is shifted to a shift register,
the charges in a shift register are shifted to an output charge well,
the charge is measured from the output charge well, and
charges from at least two pixels are accumulated into the output charge well, which method is characterised in that the pixels whose charges are accumulated are determined on the basis of the position(s) of said at least one defected pixel.

The invention also applies to an arrangement for measuring radiation comprising a charge coupled device with a matrix of charge wells arranged in rows and columns of pixels, wherein at least one of said pixels is defected, the arrangement also comprising a shift register for receiving charges from a column of the parallel register pixels,
output well for receiving charges from the shift register,
means for measuring the charge from the output well, and
means for accumulating charges from at least two pixels, which arrangement is characterised in that the arrangement further comprises means for determining the accumulated pixels on the basis of the position(s) of said at least one defected pixel.

Some preferable embodiments are described in the dependent claims.

BRIEF DESCRIPTION OF THE DRAWINGS

In the following, the invention is described in more detail by means of the attached drawings in which FIG. 1 illustrates a prior art arrangement for photometric measurements, FIG. 2 illustrates registers of a prior art CCD unit.

DETAILED DESCRIPTION

Figure 3:
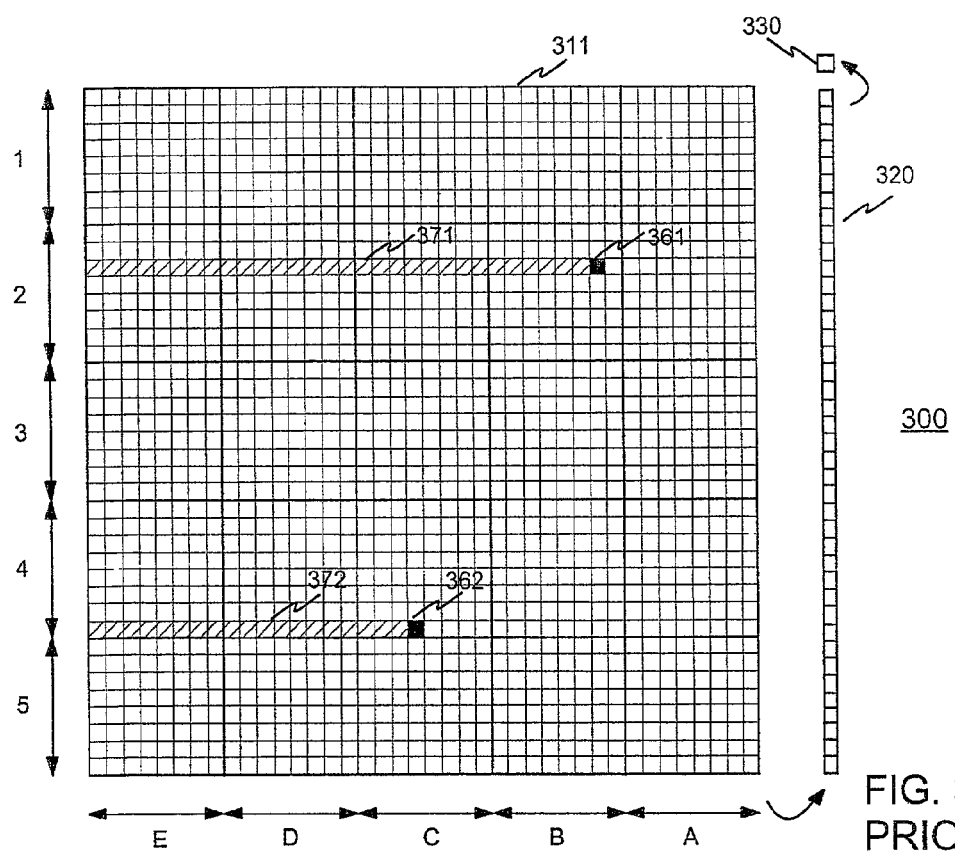
FIG. 3 illustrates a prior art binning procedure.

FIGS. 1–3 were explained above in the prior art description. In the following the invention is described in more detail referring to FIGS. 4–7.

Figure 4:
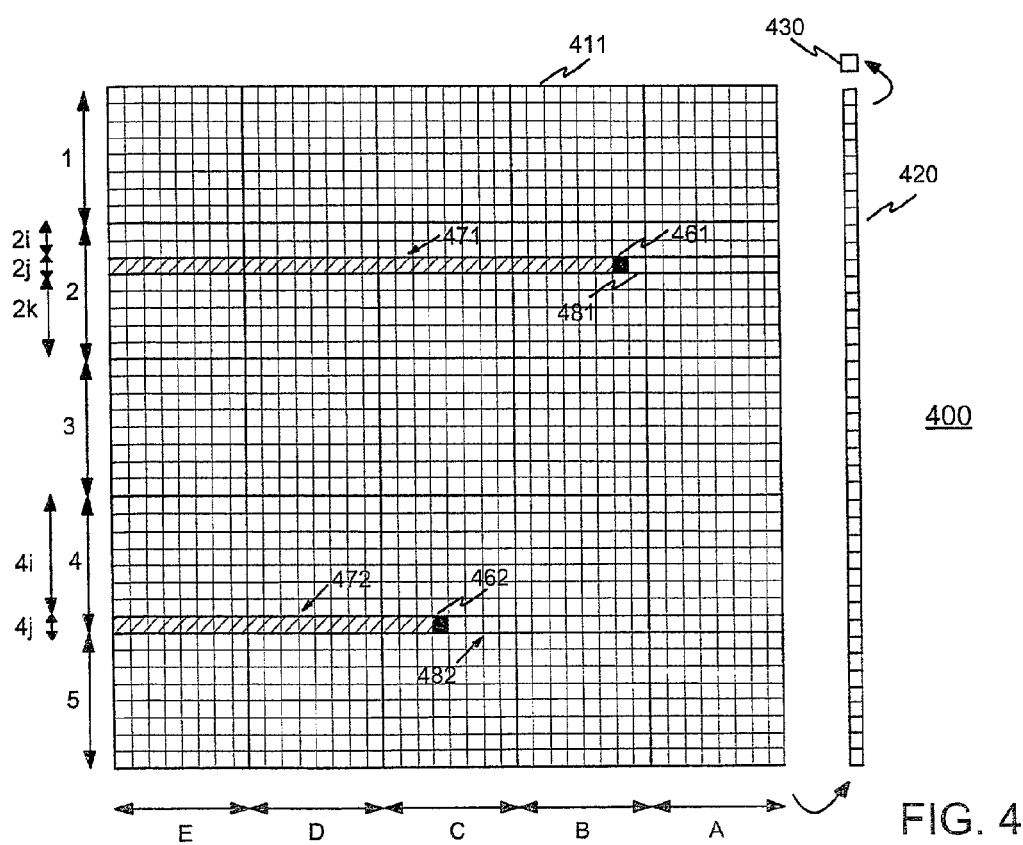
FIG. 4 illustrates an example of a binning procedure according to the invention.

FIG. 4 illustrates an example of a binning procedure according to the invention. The pixels of the charge-coupled device 411 are first grouped into super pixels including 8×8 pixels as shown in FIG. 3. There are no defects within super pixels A1–E1 and A2, so they are binned and read in a normal manner. However, super pixels B2–E2 would be defected due to a defect in pixel 461 and because this defected pixel also distorts the readout value of pixels 471. Instead of disregarding the whole super pixels B2–E2, new smaller super pixels are formed, which do not include defected pixels. For example, super pixels B2$i$–E2$i$ are formed, and super pixels B2$k$–E2$k$ are formed. These pixels do not include any defected pixel, and the measured values of accumulated charges from these super pixels can be used. The super pixels B2$j$–E2$j$ are disregarded in the readout process.

Since there are no defects within super pixels A3–E3 and A2, B2 they are binned and read in a normal manner. However, super pixels C4–E4 would be defected due to a defect in pixel 462 and because this defected pixel also distorts the readout value of pixels 472. Instead of disregarding the whole super pixels C4–E4, new smaller super pixels are formed, which do not include defected pixels. For example, super pixels C4$i$–E4$i$ are formed. These pixels do not include any defected pixel, and the measured values of accumulated charges from these super pixels can be used. Pixels C4$j$–E4$j$ are disregarded. Since there are no defects within super pixels A5–E5 they are binned and read in a normal manner.

It is possible that the readout process of the charge coupled device does not allow an optimal grouping of the super pixels. For example, it may be required that the division of super pixels B2–E2 into smaller super pixels causes that the super pixel A2 must be divided as well. In this case super pixel A1 can be divided into new super pixels A2$i$, A2$j$ and A2$k$. In a corresponding manner the super pixels A4 and B4 can be divided into super pixels A4$i$ and A4$j$ in the readout process.

In the solution described in FIG. 4 there remain a few pixels 481 and 482 that are disregarded even if they are not defected. One way to use these pixels in the measurement would be to group these pixels into super pixels 481 and 482 in the readout process. The next FIG. 5 illustrates a further solution in which these pixels are used for the measurement.

Figure 5:
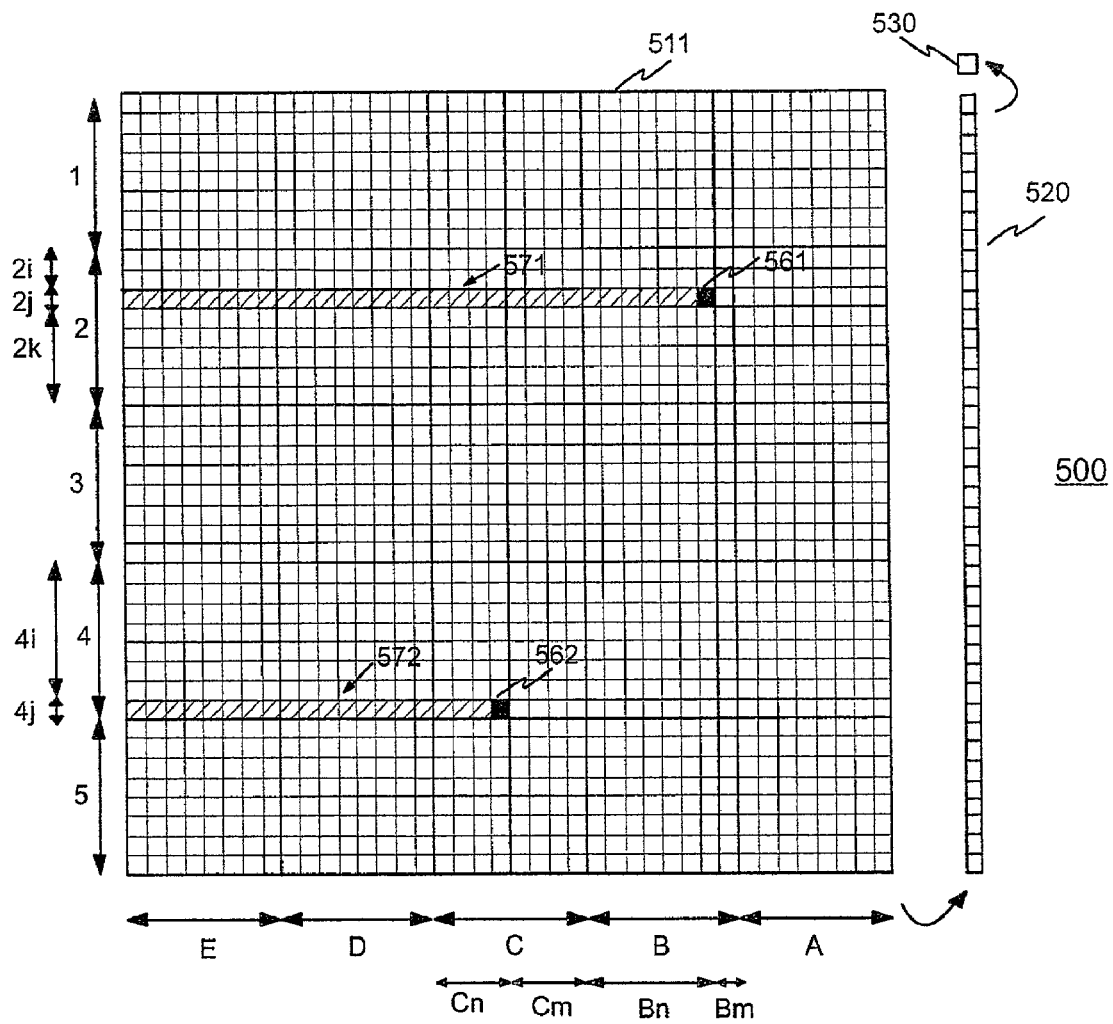
FIG. 5 illustrates another example of a binning procedure according to the invention.

FIG. 5 illustrates another example of a binning procedure according to the invention. Also in this solution the pixels of the charge-coupled device 511 are first grouped into super pixels including 8×8 pixels. There are no defects within super pixels A1–E1 and A2, so they are binned and read in a normal manner. As in the previous embodiment, super pixels C2*i*–E2*i* are formed, and super pixels C2*k*–E2*k* are formed. As these pixels do not include any defected pixel, and the measured values of accumulated charges from these super pixels can be used. However, in the embodiment of FIG. 5 the super pixel B2 is grouped into new super pixels in a different manner. In this case, super pixels Bm2, B2*i* and B2*k* are formed. This way it is possible to use the measurement information also from pixel Bm2*j*. The super pixels C2*j*–E2*j* are disregarded in the readout process.

Since there are no defects within super pixels A3–E3 and A2, B2 they are binned and read in a normal manner. As in the previous embodiment of FIG. 4, super pixels D4*i* and E4*i* are formed. As these pixels do not include any defected pixel, and the measured values of accumulated charges from these super pixels can be used. However, in the embodiment of FIG. 5 the super pixel C4 is grouped into new super pixels in a different manner. In this case, super pixels Cm4 and Cn4*i* are formed. This way it is possible to use the measurement information also from pixels Cm4*j*. Since there are no defects within super pixels A5–E5 they are binned and read in a normal manner.

Figure 6:
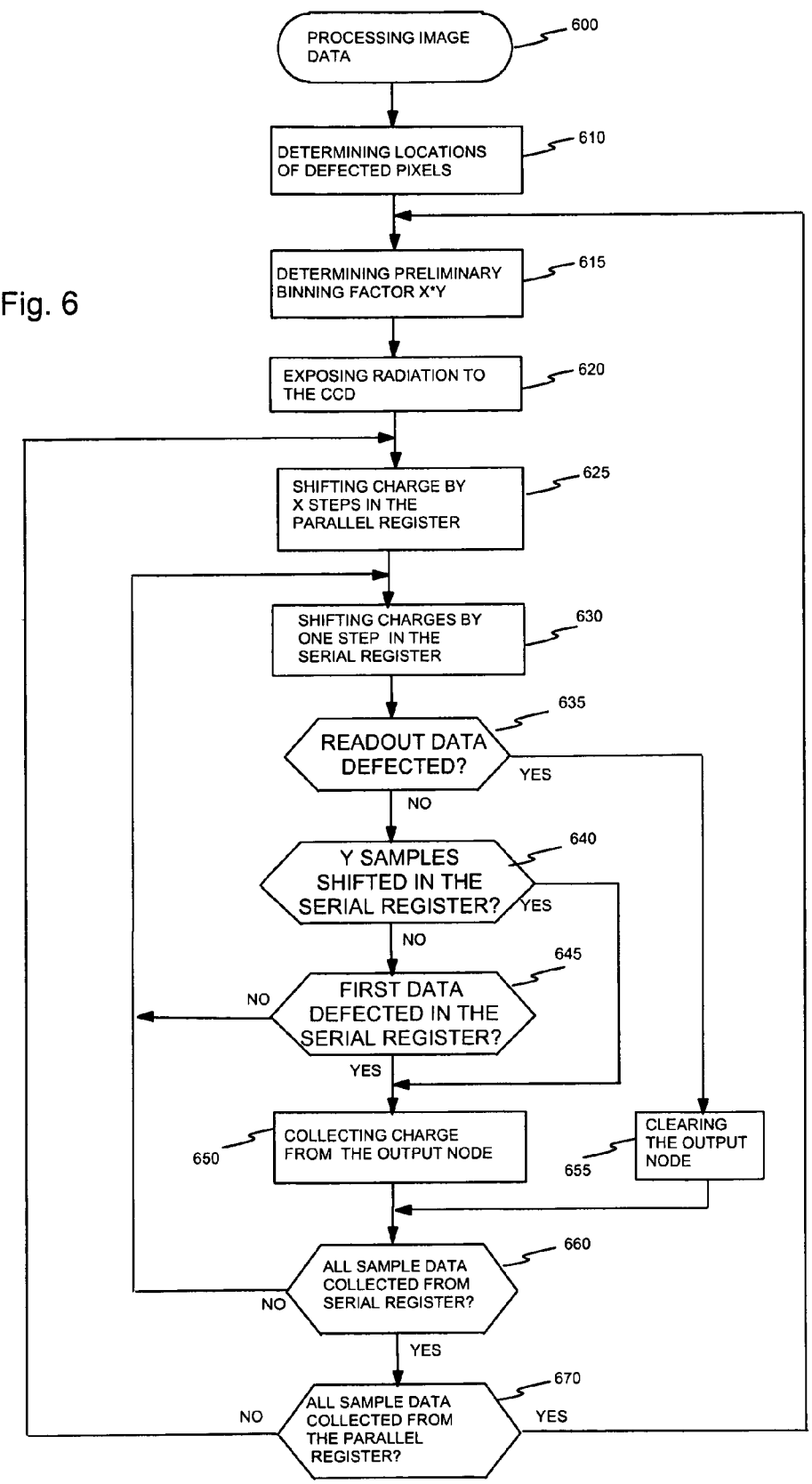
FIG. 6 illustrates a flow diagram of an example of method according to the invention for processing radiation measurement data.

FIG. 6 illustrates a flow diagram 600 of an example for a method according to the invention. This method corresponds to the binning solution shown in FIG. 4. In the method of FIG. 6, locations of defected pixels are first determined in phase 610. A preliminary binning factor X*Y is then determined for the following measurement, 615. Here X means the horizontal length and Y means the vertical length of the preliminary super pixel in number of pixels. The CCD unit then exposed to radiation, 620. In the following phase 625 charges in the parallel register are shifted by X steps towards the serial register. After the shift of X steps charges of one column of super pixels is accumulated into the serial register.

The readout of the serial register starts with shifting the charges in the serial register by one step in phase 630. Based on the locations of the defected pixels it is then checked whether the value of the charge in the output node is distorted due to the effect of a defected pixel, 635. If this value is distorted, then the value is disregarded by clearing the output node, phase 655. It is also possible that the distorted charge is collected and possibly measured, but not used for the measurement calculation of the radiation intensity.

If the charge value of the output node is not distorted by a defected pixel, then in phase 640 it is checked whether the charges shifted to the output node were the last charges of a preliminary super pixel, i.e. whether the total of Y shifts have been performed in the serial register for shifting the charges of the preliminary super pixel into the output node. If yes, the charges of the output node are collected and the charge value is read, 650. If charges of a whole super pixel has not yet been shifted into the output node in phase 640, then it is checked whether the next data in the shift register is distorted due to a defected pixel. If yes, the charges of the output node are collected and the charge value is read, 650. If the next data in the serial register is not distorted, the charges in the serial register are again shifted by one step towards the output node, phase 630.

After collecting or clearing the charges from the output node in phase 650 or 655 it is checked whether all sample data is collected from the serial register, 660. If not, the charges of the serial register are again shifted by one step towards the output node in phase 630. If all sample data is collected from the serial register it is then checked, whether all sample data is collected from the parallel register in phase 670. If not, the charges of the parallel register are again shifted by X steps, phase 625. If all charges are collected from the parallel register at this stage, the measurement is completed. When a new measurement is performed it is not necessary to determine the locations of defected again, since the location information does not change as long as the CCD unit is not changed. So the next measurement can be started by determining the preliminary binning factor, 615, or if the binning factor is not changed the measurement can be started by performing a new exposure, 620.

Figure 7:
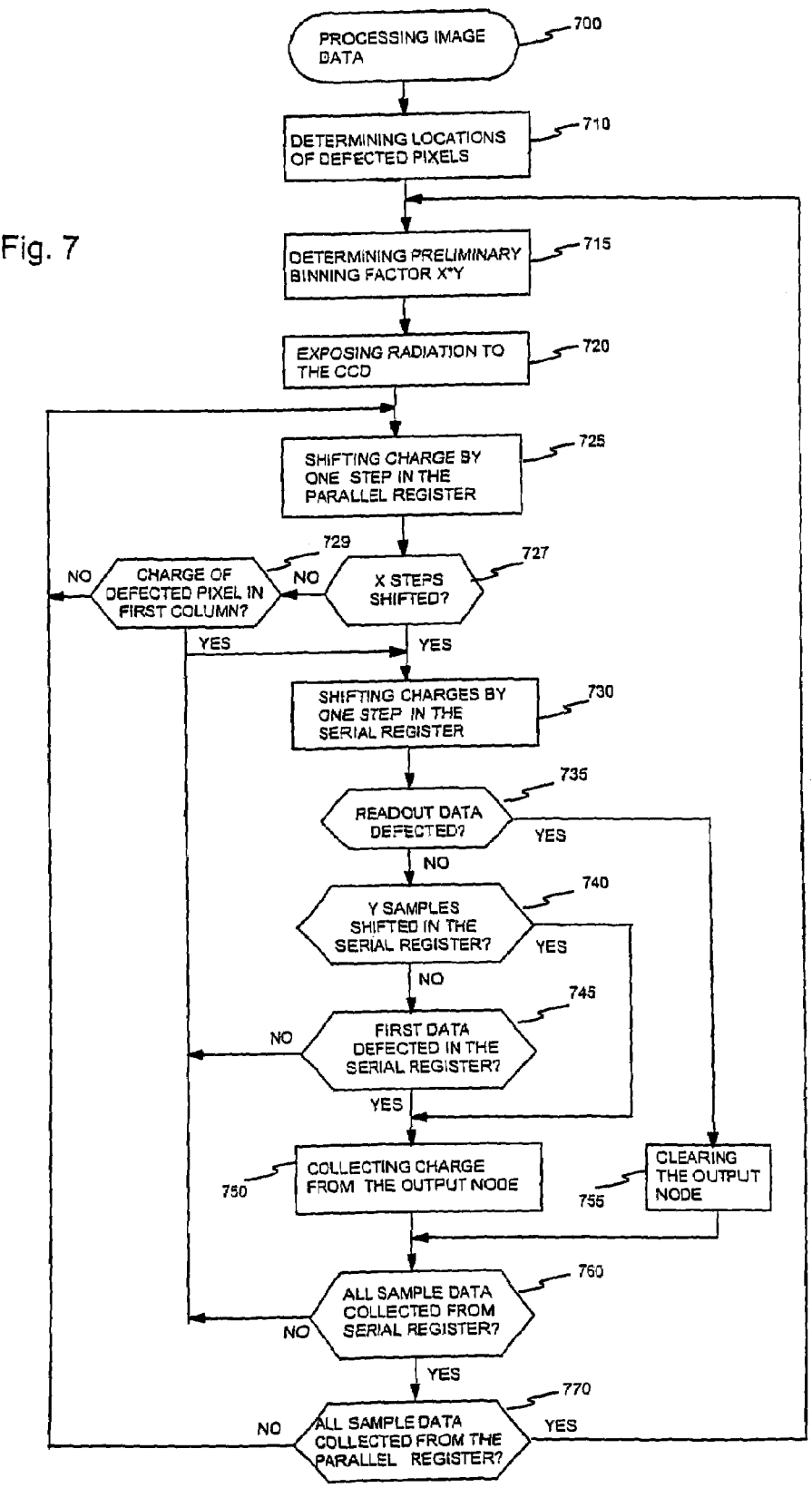
FIG. 7 illustrates a flow diagram of another embodiment according to the invention for processing radiation measurement data.

In method of FIG. 6 charge value of the output node is read when charges of distorted value enter the charge well of the serial register, which is closest to the output node. This way it is possible to accumulate in the output node charges of super pixels with smaller size, which super pixels do not include distorted charges. However, in the embodiment of FIG. 6 use is not made of all pixels that could be read without distortion. In the embodiment of FIG. 7 all such pixels are used in the measurement.

FIG. 7 illustrates a flow diagram 700 of an example for a method according to the invention. This method corresponds to the binning solution shown in FIG. 5. Also in the method of FIG. 7, locations of defected pixels are first determined in phase 710. A preliminary binning factor X*Y is then determined for the following measurement, 715. As in the previous Figure, X means the horizontal length and Y means the vertical length of the preliminary super pixel in number of pixels. The CCD unit then exposed to radiation, 720.

In the following phase 725 charges in the parallel register are shifted by one step towards the serial register. After the shift of one step it is checked whether the charges shifted into the serial register were the last charges of a preliminary super pixel, i.e. whether the total of X shifts are performed in the parallel register for shifting the charges of the preliminary super pixel into the serial register, 727. If yes, the serial register will be initiated for the readout, 730. If the pixel column shifted to the serial register was not the last one of super pixels it is then further checked whether there are charges of a defected pixel in the pixel column, which is nearest to the serial register, 729. If yes, the serial register will be initiated for the readout, 730. If there are no charges from a defected pixel in the first column, then charges of the parallel register are again shifted by one step towards the serial register, 725.

The readout of the serial register starts with shifting the charges in the serial register by one step in phase 730. Based on the locations of the defected pixels it is then checked whether the value of the charge in the output node is distorted due to the effect of a defected pixel, 735. If this value is distorted, then the value is disregarded by clearing the output node, phase 755. It is also possible that the distorted charge is collected and possibly measured, but not used for the measurement calculation of the radiation intensity.

If the charge value of the output node is not distorted by a defected pixel, then in phase 740 it is checked whether the charges shifted to the output node were the last charge of a preliminary super pixel, i.e. whether the total of Y shifts have been performed in the serial register for shifting the charges of the preliminary super pixel into the output node.

If yes, the charges of the output node are collected and the charge value is read, 750. If charges of a whole super pixel have not yet been shifted into the output node in phase 740, then it is checked whether the next data in the shift register is distorted due to a defected pixel. If yes, the charges of the output node are collected and the charge value is read, 750. If the next data in the serial register is not distorted, the charges in the serial register are again shifted by one step towards the output node, phase 730.

After collecting or clearing the charges from the output node in phase 750 or 755 it is checked whether all sample data has been collected from the serial register, 760. If not, the charges of the serial register are again shifted by one step towards the output node in phase 730. If all sample data is collected from the serial register it is then checked, whether all sample data is collected from the parallel register in phase 770. If not, the charges of the parallel register are again shifted by one step, phase 725. If all charges are collected from the parallel register at this stage, the measurement is completed. When a new measurement is performed it is not necessary to determine the locations of defected again, since the location information does not change as long as the CCD unit is not changed. So determining the preliminary binning factor, 715, can start the next measurement or if the binning factor is not changed the measurement can be started by performing a new exposure, 720.

In the method of FIG. 7 the locations of defected pixels affect both the horizontal and vertical readout of the pixels. Therefore it is possible to accumulate and measure charges from groups of pixels, which include exactly all those pixels that can be read without distortion. However, this embodiment requires a CCD unit with a possibility to perform more complex controls in the readout process.

One should note that in addition to the described embodiments, it is possible to apply various ways to form super pixels within the inventive idea. For example, it is not necessary to restrict to a preliminary binning factor, it is also possible to create super pixels with more variable sizes. For example, referring to FIG. 4, it would also be possible to create super pixels A(1+2$i$)–E(1+2$i$) with sizes 8×10.

When implementing the inventive arrangement, an ordinary CCD unit can be used except that the readout process is arranged according to inventive principle described above. It should also be noted that the "shift register" of the CCD unit can be separate from the parallel register, or a column at the edge of the parallel register can also function as a shift register, because the charges of the parallel register can usually be shifted in both horizontal and vertical directions. It is thus possible also to divide the CCD pixel matrix in functional blocks by having several columns of the pixel matrix functioning as a readout serial shift register, each shift register having a separate output charge well. This way the efficiency of readout process can be increased.

The control of the measuring process in an imaging device takes place in an arrangement of processing capacity in the form of microprocessor(s) and memory in the form of memory circuits. Such arrangements are known as such from the technology of CCD devices and relating equipment. To convert a known measurement device into equipment according to the invention it is necessary to store into the memory means a set of machine-readable instructions that instruct the microprocessor(s) to perform the operations described above. Composing and storing into memory of such instructions involves known technology which, when combined with the teachings of this patent application, is within the capabilities of a person skilled in the art. The arrangement according to the invention also includes processing means for processing and calculating measurement results, and memory means for storing the initial measurement values, intermediate calculation results and final measurement results. The functions described above can be implemented with separate or single/integrated processing means and memory means. The processing means and memory means can be included in the control unit 130 and/or computer unit 140.

Further, an arrangement according to the invention includes means for controlling shifting of the charges in the charge wells of the CCD unit. Also these means involve known technology which, when controlled according to the teachings of this patent application, is within the capabilities of a person skilled in the art. These means may be included in the CCD unit 120 and/or in the control unit 130.

Above, an embodiment of the solution according to the invention has been described. The principle according to the invention can naturally be modified within the frame of the scope defined by the claims, for example, by modification of the details of the implementation and ranges of use.

It is especially to be noted that the invention is not in any way restricted to the applications of measuring sample radiation, but it can be used in many other applications as well. The invention can be, for example, used in any CCD imaging equipment, where it is advantageous to improve the signal-to-noise ratio with binning. Thus optimal intensity information can be achieved within the imaged area.

In the field of photometric sample measurements the present invention is not in any way limited to applications where sample excitation is used, but the invention can also be used in measurements that are based, for example, on chemiluminescence.

Except using the positions of defected pixels for determining the super pixels it is additionally possible to use other criteria. For example, it is described in patent application document EP 1037010 how to use as binning criteria positions of details in an object to be imaged.

The invention claimed is:

1. A method for measuring radiation from an object with a charge coupled device comprising a matrix of pixels arranged in rows and columns, wherein at least one pixel is defected, in which method
   the radiation creates charges to the charge wells of the pixels,
   charges from a column of the pixels is shifted to a serial register,
   the charges in a serial register are shifted to an output charge well,
   the charge is measured from the output charge well and charges from at least two pixels are accumulated into the output charge well,
   characterised in that
   the pixels whose charges are accumulated are determined on the basis of the position(s) of said at least one defected pixel, and
   a value of the charge of the output charge well is read when charges of distorted value enter the charge well of the serial register, which is closest to the output charge well.

2. A method according to claim 1, characterised in that charges from the serial register are shifted to the output charge well when charge from a defected pixel enters the pixel column of the parallel register, which is closest the serial register.

3. A method according to claim 1, characterised in that such charge values of the output charge well are ignored, which are distorted by at least one defected pixel.

4. A method according to claim 1, characterised in that the pixels that are accumulated and measured include all pixels the charges of which are not distorted by defected pixels in the readout process.

5. A method according to claim 1, characterised in that the groups of pixels whose charges are accumulated as super pixels are determined by the steps of:
dividing the pixels into rectangular areas of same size,
when none of charges in a group of pixels within one rectangular area is distorted in the readout process by a defected pixel, said group of pixels are accumulated as a super pixel,
when any charges in a group of pixels within one rectangular area is distorted in the readout process by a defected pixel at least one subset group of pixels is formed wherein none of charges in the subset group of pixels within said rectangular area is distorted in the readout process by a defected pixel said subset group of pixels being accumulated as a super pixel.

6. A method according to claim 1, characterised in that the charge coupled device is scanned and the defected pixels are located by said scanning.

7. Use of a method according to claim 1 for measuring radiation from a sample on a well plate.

8. An arrangement for measuring radiation comprising a charge coupled device with a matrix of charge wells arranged in rows and columns of pixels, wherein at least one of said pixels is defected, the arrangement also comprising
a serial register for receiving charges from a column of the parallel register pixels,
output well for receiving charges from the serial register,
means for measuring the charge from the output well, and
means for accumulating charges from at least two pixels, characterised in that the arrangement further comprises
means for determining the accumulated pixels on the basis of the position(s) of said at least one defected pixel, and
means for initiating reading a value of the charge of the output charge well charges when distorted value enter the charge well of the serial register, which is closest to the output charge well.

9. An arrangement according to claim 8, characterised in that it comprises means for initiating shifting the charges from the serial register to the output charge well when charge from a defected pixel enters the pixel column of the parallel register, which is closest to the serial register.

10. An arrangement according to claim 8, characterised in that it comprises means for ignoring such charge values of the output charge well, which are distorted by at least one defected pixel.

11. An arrangement according to claim 8, characterised in that it comprises means for determining the groups of pixels that are selected to be accumulated and measured to include all pixels the charges of which are not distorted by defected pixels in the readout process.

12. An arrangement according to claim 8, characterised in that the means for determining the groups of pixels whose charges are accumulated as super pixels comprise:
means for dividing the pixels into rectangular areas of same size (A1, A2, . . . E5),
means for accumulating a group of pixels as a super pixel when none of charges in said group of pixels within one said rectangular area is distorted in the readout process by a defected pixel, and
means for detecting when any value of charges in a group of pixels within one rectangular area is distorted in the readout process by a defected pixel (B2–E2, C4–E4) and means for forming at least one subset group of pixels (B2$i$–E2$i$, B2$k$–E2$k$, C4$i$–E4$i$) wherein none of charges in the subset group of pixels within said rectangular area is distorted in the readout process by a defected pixel and means for accumulating said subset group of pixels as a super pixel.

13. An arrangement according to claim 8, characterised in that it comprises means for measuring radiation from a sample on a well plate.

14. A method for measuring radiation from an object, with a charge coupled device comprising a matrix of pixels arranged in rows and columns, wherein at least one pixel is defected, in which method
the radiation creates charges to the charge wells of the pixels,
charges from a column of the pixels are shifted to a serial register,
the charges in a serial register are shifted to an output charge well,
the charge is measured from the output charge well, and
charges from at least two pixels are accumulated into the output charge well, wherein,
the pixels whose charges are accumulated are determined on the basis of the position(s) of said at least one defected pixel so that defective pixel values do not propagate beyond the output charge well, and
a value of the charge of the output charge well is read when charges of distorted value enter the charge well of the serial register, which is closest to the output charge well.

15. A method according to claim 14, characterised in that charges from the serial register are shifted to the output charge well when charge from a defected pixel enters the pixel column of the parallel register, which is closest the serial register.

16. A method according to claim 14, characterised in that such charge values of the output charge well are ignored, which are distorted by at least one defected pixel.

17. A method according to claim 14, characterised in that the pixels that are accumulated and measured include all pixels the charges of which are not distorted by defected pixels in the readout process.

* * * * *